United States Patent Office 3,557,251
Patented Jan. 19, 1971

3,557,251
COMPOSITIONS COMPRISING A VINYL CHLORIDE RESIN AND A GRAFT POLYMER
Akira Tanaka and Koji Kato, Yokohama, and Shingo Futamura, Tokyo, Japan, assignors to The Japanese Geon Company, Ltd., Tokyo, Japan, a corporation of Japan
No Drawing. Filed Dec. 27, 1967, Ser. No. 693,722
Claims priority, application Japan, Dec. 28, 1966, 42/85,406
Int. Cl. C08f 29/24, 41/12
U.S. Cl. 260—876                                  4 Claims

ABSTRACT OF THE DISCLOSURE

Vinyl chloride resin compositions comprising a vinyl chloride resin [I] selected from the group consisting of vinyl chloride homopolymers and vinyl chloride copolymers containing at least 70% by weight of vinyl chloride, and a graft copolymer [II] obtained by graft copolymerizing acrylonitrile and an aromatic vinyl and an acrylic acid alkyl ester to an acrylonitrile-aromatic vinyl-butadiene trunk copolymers.

---

This invention relates to vinyl chloride resin compositions possessing a high degree of impact strength and superior transparency. More particularly, the invention relates to vinyl chloride resin compositions comprising a vinyl chloride resin [I] selected from the group consisting of vinyl chloride homopolymers and vinyl chloride copolymers containing at least 70% by weight of vinyl chloride, and a graft copolymer [II] obtained by graft copolymerizing acrylonitrile and an aromatic vinyl and, as required, an acrylic acid alkyl ester to an acrylontrile-aromatic vinyl-butadiene trunk copolymers.

The vinyl chloride resins find wide use in view of their excellent chemical and physical properties, but they have the shortcoming that their impact strength is not adequate. It is known that a composition which provides shaped articles excelling in impact strength can be obtained by blending with vinyl chloride resins a graft polymer which is obtained by graft polymerizing acrylonitrile and styrene to a polybutadiene or a butadiene-styrene copolymer. Again, it is also known that the composition obtained by blending with the vinyl chloride resins a graft polymer obtained by graft polymerizing acrylonitrile, styrene and methyl methacrylate to the butadiene-styrene copolymer provides shaped articles excelling in toughness, weatherability and transparency. However, with the broadening of the field of application of the vinyl chloride compositions, the requirements with respect to their properties are becoming much higher. Namely, it is required that the possession of excellent impact strength, transparency, and processability is concurrently satisfied and moreover that their transparency is equal to that of the vinyl chloride resins. Further, an improvement in the phenomenon of turning white when bent, a serious defect which is peculiar to this type of composition, is being desired. Again, recently, the completely nontoxic vinyl chloride resins which have been incorporated with a stabilizer containing calcium, zinc or magnesium have been arousing interest as vinyl chloride resins for use as containers or packaging materials of food products. A stabilizer of this sort possesses a problem since it causes a decline in the transparency of the vinyl chloride resins. Lately, the demand for an improvement of this problem is particularly ardent with the increase in the demand for containers and packaging materials of vinyl chloride resins.

However, in the case of the composition comprising a vinyl chloride resin and a graft polymer obtained by graft copolymerizing acrylonitrile and styrene, or acrylonitrile, styrene and methyl methacrylate to a polybutadiene or a butadiene-styrene copolymer, or a graft polymer obtained by merely graft copolymerizing acrylonitrile and styrene to an acrylonitrile-styrene-butadiene copolymer, the impact strength is superior but the transparency does not equal that of the vinyl chloride resins and there also appears the whitening phenomenon when bent. Again, there is the defect that the transparency is inferior when the aforesaid stabilizers are incorporated.

It is therefore an object of this invention to provide vinyl chloride resin compositions which not only have a high degree of impact strength, excellent transparency and desirable processability, but also do not demonstrate the whitening phenomenon when bent and, moreover, composition which exhibit a superior transparency even when incorporated with the aforesaid non-toxic stabilizers in the usual amounts, i.e., 0.5–10% by weight, based on the total polymers.

Other objects and advantages of the invention will be apparent from the following description.

We found that the hereinabove described objects of the invention could be achieved by compositions comprising a vinyl chloride resin and a graft polymer obtained by graft polymerizing acrylonitrile and an aromatic vinyl, and if further desired, an acrylic acid alkyl ester in the presence of an acrylonitrile-aromatic vinyl-butadiene trunk copolymer latex having a specific monomeric composition consisting of particles at least 90% of which are 200 to 800 A. in diameter.

More specifically, the vinyl chloride resin compositions which are in agreement with the aforesaid objects of the invention are those comprising

[I] 99–50% by weight of a vinyl chloride resin, and
[II] 1–50% by weight of a graft polymer obtained by graft polymerizing 20–100 parts by weight of a monomeric mixture of 40–90% by weight of an aromatic vinyl, 10–40% by weight of acrylonitrile and 1–10% by weight of an acrylic acid alkyl ester having an alkyl group of 1–10 carbon atoms, in an aqueous dispersion containing 100 parts by weight of a trunk copolymer consisting of 50–88% by weight of butadiene, 10–30% by weight of an aromatic vinyl and 2–20% by weight of acrylonitrile, at least 90% of the particles of which are 200–800 A. in diameter.

As the vinyl chloride resin [I], one of the components of the invention composition, the homopolymers of vinyl chloride and/or vinyl chloride copolymers containing at least 70% by weight of vinyl chloride are used. Both are commercially available in various degrees of polymerization. These commercially available products are usable in this invention. Those whose degree of polymerization exceed 700 are to be preferred from the standpoint of impact strength.

The other component, the graft polymer [II], is an indispensable component for achieving the objectives of the invention. This graft polymer must be produced under the following conditions.

The trunk copolymer of the graft polymer [II], which is a rubbery polymer, must be composed of 50–88% by weight of butadiene, 10–30% by weight of an aromatic vinyl and 2–20% by weight of acrylonitrile. When the butadiene is below 50% by weight, superior toughness cannot be imparted to the vinyl chloride resin composition. When the acrylonitrile is not at least 2% by weight, a whitening of the vinyl chloride resin composition when it is bent tends to appear and its transparency is also not satisfactory. On the other hand, when the acrylonitrile content exceeds 20% by weight, either the composition becomes discolored or its transparency suffers. When the content of the aromatic vinyl is not at least 10% by weight or exceeds 30% by weight, the vinyl chloride composition cannot be ensured a transparency which is comparable to or better than that of the vinyl chloride resins. The most usually used aromatic vinyl is styrene, but the substituted styrenes such as alpha-methyl styrene, vinyl toluene, chlorostyrene, dichlorostyrene and methoxy-styrene are also usable. Ninety percent of particles in the aqueous dispersion of the trunk copolymer must be those whose diameter is 200 to 800 A. If an aqueous dispersion in which 10% or more of the particles are large particles having a diameter in excess of 800 A. is used, vinyl chloride resin compositions having such superior properties as that the transparency is comparable to or better than that of the vinyl chloride resins and that no whitening occurs when bent, as intended by the invention, cannot be provided. On the other hand, if there are too many small particles of less than 200 A., the composition cannot be imparted impact strength. The monomeric mixture to be grafted must be composed of 10–40% by weight of acrylonitrile, 40–90% by weight of an aromatic vinyl and 0–20% by weight of an acrylic acid alkyl ester. When the content of acrylonitrile is not at least 10% by weight the impact strength of the resulting vinyl chloride resin compositions becomes low, whereas when the content of acrylonitrile exceeds 40% by weight, the discoloration of the composition becomes pronounced. The use of acrylic acid alkyl esters is desirable since much more superior processability and transparency are imparted to the vinyl chloride resin compositions. As the acrylic acid alkyl esters, those in which the alkyl group contains 1 to 10 carbon atoms such, for example, as methyl acrylate, ethyl acrylate, n-butyl acrylate and 2-ethylhexyl acrylate are suitably usable. When these acrylic acid alkyl esters are used in an amount exceeding 20% by weight, the whitening phenomenon when bent appears in the vinyl chloride resin compositions. The most preferred amount in which these acrylic acid esters are used is from 1% to 10% by weight. The monomeric mixture is used in an amount of 20 to 100 parts by weight per 100 parts by weight of the trunk polymer. When the amount used is less than 20 parts by weight, the impact strength of the vinyl chloride resin compositions declines and the whitening phenomenon when bent also becomes pronounced. On the other hand, the impact strength also declines when the amount exceeds 100 parts by weight. The monomeric mixture to be grafted may be added to the aqueous trunk copolymer dispersion at a time, stepwise or continuously.

Vinyl chloride resin compositions whose transparency is good and impact strength is high and in which the whitening phenomenon when bent does not occur, can be obtained by blending the vinyl chloride resin [I] and graft polymer [II] in any proportion in the range from 99–50% by weight of the former to 1–50% by weight of the latter. When the proportion of the vinyl chloride resin [I] is less than 50% by weight, the tensile strength declines and the composition does not demonstrate the characteristic properties of a rigid resin. On the other hand, the graft polymer [II] in an amount of less than 1% by weight manifests little, if any, effects.

Various additives such as a heat stabilizer, light stabilizer, filler, pigment, lubricant, processing aid, i.e., methyl methacrylate-ethyl acrylate copolymer, acrylonitrile-styrene copolymer, and other impact enhancing agent etc. may be added to the vinyl chloride resin composition.

The following examples are given to specifically illustrate the invention. These examples are given for furthering a better understanding of the invention and are not in limitation thereof. The parts or percentages in the examples are on a weight basis.

EXAMPLES 1–13

(1) Preparation of the aqueous dispersion of trunk copolymer of small particle size for use in this invention A monomeric mixture of the following composition was charged to a pressure polymerization vessel.

| | Parts |
|---|---|
| Monomeric mixture [1] | 100 |
| Tertiary dodecylmercaptan | 0.2 |
| Potassium oleate | 4.0 |
| Potassium persulfate | 0.3 |
| Water | 300 |

[1] The composition of the monomeric mixture is shown in Table I, below.

An aqueous dispersion of a trunk copolymer of small particle size was obtained at a conversion rate of about 95% by reacting the contents for about 25 hours at 50° C. with stirring. This trunk copolymer has practically the same composition as that of the monomeric mixture charged. It was confirmed by an electron microscope photograph that above 90% of the copolymer particles in the aqueous dispersion were those falling in the range of particle diameters 400 to 800 A.

(2) Preparation of the aqueous dispersion of trunk copolymer of large particle size for use as control A monomeric mixture of the following composition was charged to a pressure polymerization vessel.

| | Parts |
|---|---|
| Monomeric mixture [1] | 100 |
| Tertiary dodecylmercaptan | 0.2 |
| Potassium oleate | 3.0 |
| Sodium pyrophosphate | 1.0 |
| Potassium persulfate | 0.2 |
| Water | 65 |

[1] The composition of the monomeric mixture is shown in Table I, below.

An aqueous dispersion of a trunk copolymer of large particle size was obtained at a conversion rate of about 95% by reacting the contents for about 42 hours at 50° C. with vigorous stirring. This trunk copolymer has practically the same composition as that of the monomeric mixture charged. It was confirmed by an electron microscope photograph that the size distribution of the copolymer particles in the aqueous dispersion ranged between 1000 and 5000 A. and that the number average particle diameter was about 1800 A.

(3) Preparation of the graft polymer

A pressure polymerization vessel was charged with a mixture having the following composition.

| | Parts |
|---|---|
| Trunk copolymer dispersion (as solids portion) | 70 |
| Monomeric mixture [1] | 30 |
| Tertiary dodecylmercaptan | 0.06 |
| Potassium oleate | 1.2 |
| Potassium persulfate | 0.2 |
| Water | 250 |

[1] The composition of the monomeric mixture grafted is shown in Table I, below.

An aqueous dispersion of a graft polymer was obtained at a conversion rate of about 95% by reacting the contents for about 10 hours at 60° C. with stirring. One hundred parts of the resulting aqueous dispersion of the graft polymer were added to 200 parts of an aqueous 0.5% calcium chloride solution of 40° C. to carry out the coagulation of the polymer, after which the particles were agglomerated by heating at 90° C. followed by separation by filtration and drying to obtain the graft polymer in powder form.

(4) Preparation of the vinyl chloride resin composition

The resulting graft polymer was mixed with a vinyl chloride homopolymer of an average degree of polymerization of about 1050 with the following composition, and the mixture was kneaded for 10 minutes on hot rolls at 160° C. and then molded with a hot press at 165° C. for 15 minutes. The various properties of the molded composition are shown in Table I, below.

| | Parts |
|---|---|
| Vinylchloride homopolymer (GEON 103EP) | 90 |
| Graft polymer | 10 |
| Dibutyl tin mercaptide (ADVASTAB 17MJ) | 4 |

TABLE I.—COMPOSITION OF GRAFT POLYMER AND PROPERTIES OF THE VINYL CHLORIDE RESIN COMPOSITION

| Example | Compositions of monomeric mixture charged of trunk copolymer, percent | | | Particle size of trunk copolymer | Composition of monomeric mixture grafted, percent | | | Impact strength, kg. cm./cm.$^2$ | Light transmittance, percent | Surface texture of extruded ribbon | Whitening when bent |
|---|---|---|---|---|---|---|---|---|---|---|---|
| | Acrylonitrile | Butadiene | Styrene | | Acrylonitrile | Ethyl acrylate | Styrene | | | | |
| 1 | 10 | 75 | 15 | Small diameter | 30 | 3 | 67 | >60 | 74 | Good | No |
| 2 | 5 | 70 | 25 | do | 30 | 3 | 67 | >60 | 74 | do | No |
| 3 | 20 | 65 | 15 | do | 30 | 3 | 67 | >60 | 73 | do | No |
| 4 | 10 | 75 | 15 | do | 20 | 0 | 80 | >60 | 73 | Fair | No |
| 5 | 10 | 75 | 15 | do | 30 | 10 | 60 | >60 | 74 | Excellent | No |
| 6 (Control) | 10 | 75 | 15 | {80% small diameter, 20% large diameter} | 30 | 0 | 70 | >60 | 65 | Fair | Yes |
| 7 (Control) | 10 | 75 | 15 | do | 30 | 3 | 67 | >60 | 68 | Good | Yes |
| 8 (Control) | 10 | 75 | 15 | Small diameter | 30 | 25 | 55 | >60 | 74 | Excellent | Yes |
| 9 (Control) | 3 | 90 | 7 | do | 30 | 0 | 70 | >60 | 63 | Fair | Yes |
| 10 (Control) | 10 | 50 | 40 | do | 30 | 0 | 70 | 13.8 | 66 | do | Yes |
| 11 (Control) | 0 | 100 | 0 | do | 30 | 0 | 70 | >60 | 32 | do | Yes |
| 12 (Control) | Commercial SBR latex | | | ($^1$) | 30 | 0 | 70 | >60 | 69 | do | Yes |
| 13 (Control) | Commercial NBR latex | | | ($^1$) | 30 | 0 | 70 | 6.8 | 45 | do | Yes |

$^1$ Above 90% of particle diameter 400–800 A.

The "commercial SBR latex" and "commercial NBR latex" of Examples 12 and 13 are respectively a copolymer latex of about 23.5% styrene and about 76.5% butadiene (Nippol LX 102, a product of The Japanese Geon Company, Japan) and a copolymer latex of about 30% acrylonitrile and about 70% butadiene (Hycar 1562, a product of The Japanese Geon Company, Japan).

On the other hand, as to the particle size, that referred to as "small diameter" denotes an aqueous dispersion of a trunk copolymer, whose particles are of small diameter, which have been prepared by the method of preparation (1), whereas those of "large diameter" have been prepared by the method of preparation (2).

The "impact strength" in Table I was tested in accordance with the JIS K 6745 method on a notched specimen at 25° C., using the Charpy impact tester.

The "light transmittance" was determined using a pressed sheet 5 mm. in thickness and a light having a wavelength of 550 mµ.

The "surface texture of extruded ribbon" was a rating obtained in the following manner. The surface condition of a ribbon extruded using a Koka type flow tester with a nozzle 1 mm. in diameter and 10 mm. long and at a temperature of 190° C. and a load of 200 kg./cm.$^2$ was observed with the unaided eye and judged as being excellent, good and fair, in the order given.

The "whitening when bent," which indicates as to whether or not a whitening phenomenon occurs when an 0.5 mm. film was bent, was indicated by means of yes or no.

It can be appreciated from these examples that for obtaining vinyl chloride resin compositions which possess a high degree of transparency and in which the whitening phenomenon does not occur when bent, as intended by the invention, the trunk copolymer must be an acrylonitrile-aromatic vinyl-butadiene copolymer the monomeric composition of which comes within a defined range and the aqueous dispersion of the trunk copolymer must be one in which 90% of the particles are of those whose particle diameter ranges between 200 and 800 A. Further, it can be seen from these examples that the use of ethyl acrylate along with acrylonitrile and an aromatic vinyl is effective for obtaining a smooth surface texture for the extruded product.

EXAMPLES 14–20

A graft polymer and a vinyl chloride homopolymer were mixed in accordance with the following compositions [(a) and (b)]. After kneading the mixtures for 10 minutes at 160° C., they were molded by pressing for 15 minutes at 165° C., after which the properties of the molded compositions were measured. The proportion in which the vinyl chloride polymer and the graft polymer were mixed and the properties of the compositions are shown in Table II. The graft polymers used were those of the hereinbefore given Examples 2 and 12.

| | Composition | |
|---|---|---|
| | (a) | (b) |
| Sum of vinyl chloride homopolymer (GEON 103EP) and graft polymer | 100 | 100 |
| Dibutyl tin mercaptide (ADVASTAB 17MJ) | 4 | |
| Epoxy stabilizer (MARK EP-5) | | 4 |
| Calcium-zinc-magnesium composite stabilizer (MARK 36) | | 2 |
| Chelater (MARK 329) | | 1 |

TABLE II

| Example | Vinyl chloride homopolymer, percent | Graft polymer, percent | In the case of the graft polymer of Example 2 | | | | | In the case of the graft polymer of Example 12 | |
|---|---|---|---|---|---|---|---|---|---|
| | | | Impact strength, kg. cm./cm.$^2$, composition (a) | Transmittance, percent | | Tensile strength, kg./cm.$^2$, composition (a) | Whitening when bent, composition (a) | Transmittance, percent | |
| | | | | Composition (a) | Composition (b) | | | Composition (a) | Composition (b) |
| 14 (Control) | 100 | 0 | 3.5 | 74 | 37 | 590 | No | 74 | 37 |
| 15 | 97 | 3 | 5.6 | 74 | 44 | 570 | No | | |
| 16 | 90 | 10 | >60 | 74 | 53 | 490 | No | 69 | 41 |
| 17 | 75 | 25 | >60 | 73 | 55 | 440 | No | 62 | 36 |
| 18 | 60 | 40 | >60 | 73 | 52 | 360 | No | 51 | |
| 19 (Control) | 40 | 60 | >60 | 73 | 50 | 310 | No | | |
| 20 (Control) | 0 | 100 | >60 | 72 | 63 | 130 | No | 68 | 60 |

The "tensile strength" in Table II is a value obtained by conducting the tensile test at 25° C. in accordance with the JIS K 6745 method using the Schopper tester. The testing of the other properties was carried as hereinbefore described.

It is seen from the foregoing Examples 14–20 that the transparency of the vinyl chloride resin compositions of the invention is not impaired by the addition of stabilizers. Namely, in the instance of the addition of a tin type stabilizer to the invention vinyl chloride resin compositions [Composition (a) of Examples 15–18], the transparency demonstrated was practically the same as that of the instance of the addition of the same stabilizer to the vinyl chloride resin alone [Composition (a) of Example 14]. Further, when the calcium-zinc-magnesium type stabilizer was added to the invention vinyl chloride resin compositions [Composition (b) of Examples 15–18], the transparency demonstrated was much superior to that of the instance where the same stabilizer was added to the vinyl chloride resin alone [Composition (b) of Example 14].

We claim:

1. A vinyl chloride resin composition comprising 99–50 percent by weight of a vinyl chloride resin selected from the group consisting of vinyl chloride homopolymers and vinyl chloride copolymers containing at least 70% by weight vinyl chloride and 1–50 percent by weight of a graft polymer obtained by graft polymerizing 20–100 parts by weight of a monomeric mixture of 40–90 percent by weight of an aromatic vinyl compound, 10–40 percent by weight of acrylonitrile and 1–10 percent by weight of an acrylic acid alkyl ester having an alkyl group of 1–10 carbon atoms in an aqueous dispersion of 100 parts by weight of a trunk copolymer consisting of 50–88 percent by weight of butadiene, 10–30 percent by weight of an aromatic vinyl compound and 2–20 percent by weight of acrylonitrile, at least 90 percent of the particles of said trunk copolymer having a particle diameter ranging between 200 and 800 A.

2. The composition of claim 1 in which the aromatic vinyl compound is styrene.

3. The composition of claim 1 in which the acrylic acid alkyl ester is ethyl acrylate.

4. A vinyl chloride resin composition excellent in transparency which comprises a mixture of 99–50 percent by weight of a vinyl chloride resin selected from the group consisting of vinyl chloride homopolymers and vinyl chloride copolymers containing at least 70% by weight vinyl chloride and 1–50 percent by weight of a graft polymer in which the mixture is blended 0.5–10 percent by weight of a stabilizer containing calcium, zinc or magnesium, based on said mixture, said graft polymer being obtained by graft polymerizing 20–100 parts by weight of a monomeric mixture of 40–90 percent by weight of an aromatic vinyl compound, 10–40 percent by weight of acrylonitrile and 1–10 percent by weight of an acrylic acid alkyl ester having an alkyl group of 1–10 carbon atoms in an aqueous dispersion of 100 parts by weight of a trunk copolymer consisting of 50–88 percent by weight of butadiene, 10–30 percent by weight of an aromatic vinyl compound, and 2–20 percent by weight of acrylonitrile, at least 90 percent of the particles of said trunk copolymer having a particle diameter ranging between 200 and 800 A.

References Cited

UNITED STATES PATENTS

| 3,287,443 | 11/1966 | Saito et al. | 260—876 |
| 3,118,854 | 1/1964 | Hess et al. | 260—876 |
| 3,004,000 | 10/1961 | Rauder et al. | 260—45.75 |

FOREIGN PATENTS

| 937,747 | 9/1963 | Great Britain | 260—876 |

MURRAY TILLMAN, Primary Examiner

C. J. SECCURO, Assistant Examiner

U.S. Cl. X.R.

260—45.75, 880